O. H. MEYERS.
TIRE INFLATING AND PRESSURE INDICATING DEVICE.
APPLICATION FILED MAR. 16, 1918.
1,322,196.
Patented Nov. 18, 1919.
2 SHEETS—SHEET 1.
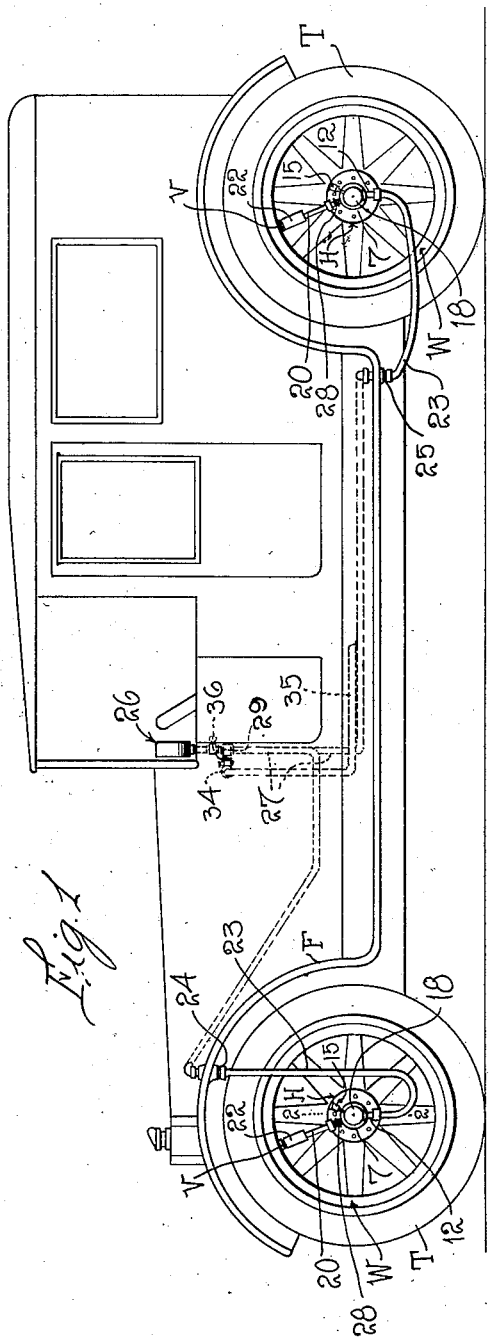
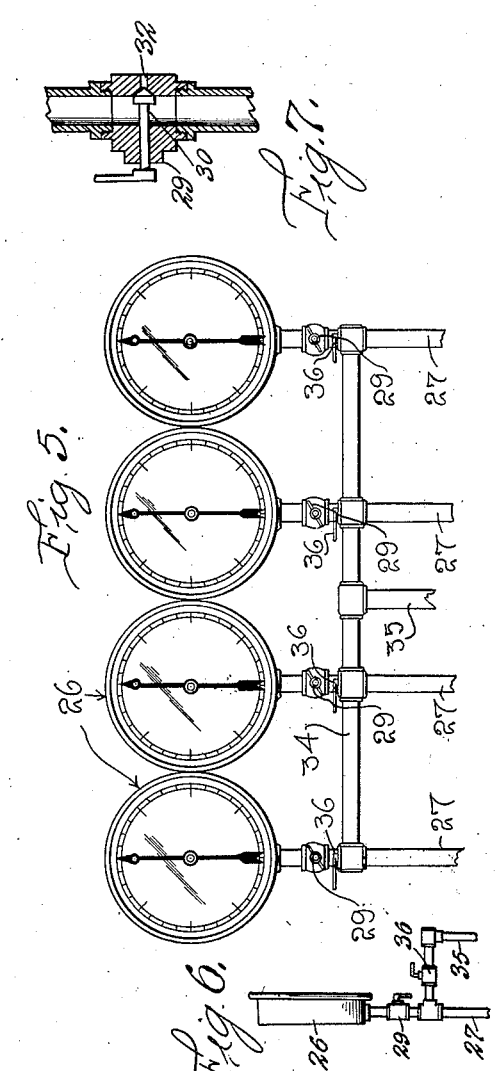
Inventor
O. H. Meyers
By Watson E. Coleman
Attorney O. H. MEYERS.
TIRE INFLATING AND PRESSURE INDICATING DEVICE.
APPLICATION FILED MAR. 16, 1918.
1,322,196.
Patented Nov. 18, 1919.
2 SHEETS—SHEET 2.
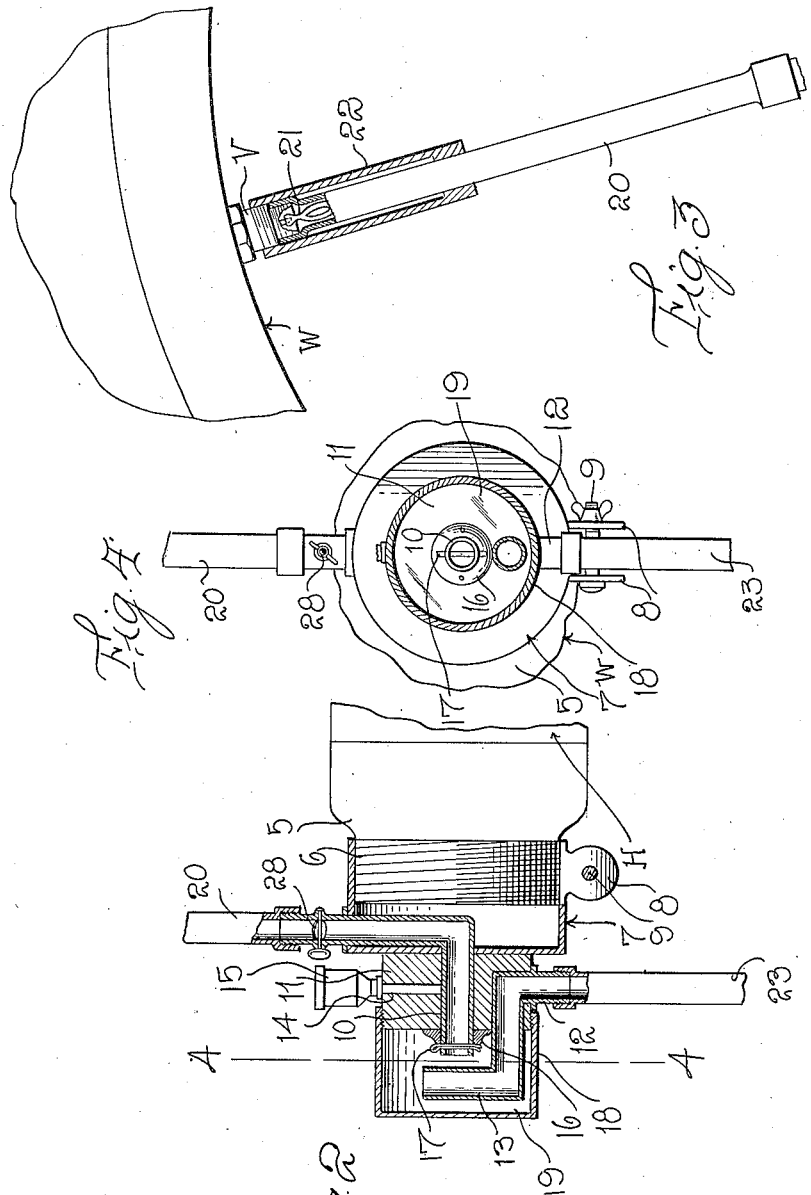
Inventor
O. H. Meyers
By Watson E. Coleman
Attorney

UNITED STATES PATENT OFFICE.

ORLANDO H. MEYERS, OF DUDLEY, ILLINOIS.

TIRE-INFLATING AND PRESSURE-INDICATING DEVICE.

1,322,196.   Specification of Letters Patent.   Patented Nov. 18, 1919.

Application filed March 16, 1918. Serial No. 222,887.

*To all whom it may concern:*

Be it known that I, ORLANDO H. MEYERS, a citizen of the United States, residing at Dudley, in the county of Edgar and State of Illinois, have invented certain new and useful Improvements in Tire-Inflating and Pressure-Indicating Devices, of which the following is a specification, reference being had to the accompanying drawings.

This invention relates to an improved tire inflating and pressure indicating device, and has for its primary object to provide means whereby the several pneumatic tires of a motor vehicle may be inflated to a predetermined pressure while the vehicle is in operation.

It is also another important object of the invention to provide indicating means mounted upon the dash of the vehicle body whereby the operator can instantly ascertain the amount of air pressure in any one of the vehicle tires.

It is a more particular object of the invention to provide gages mounted on the dash board of a vehicle and respectively connected to the tire valves of the vehicle wheels, each of said connections including a relatively stationary air chamber supported by the hub cap or extension of the vehicle wheel.

It is also an important object of the invention to provide an improved mounting and arrangement of the several parts whereby the escape of air pressure from the tire tube, is effectually prevented.

It is also one of the secondary objects of my invention to provide means whereby the operator may readily ascertain whether or not the air pipe connection between any one of the pressure gages and the wheel tire is obstructed.

And it is a further general object of my invention to provide a device for the above purpose which is relatively simple and inexpensive in its construction, may be readily applied to the ordinary motor vehicle without necessitating any material alterations and is highly efficient and reliable in practical use.

With the above and other objects in view the invention consists in the improved combination, construction and relative arrangement of the several parts as will be hereinafter more fully described, subsequently claimed and illustrated in the accompanying drawing in which like reference characters designate corresponding parts throughout the several views and wherein;

Figure 1 is a side elevation of a motor vehicle having my improved tire inflating and pressure indicating device applied thereto;

Fig. 2 is a sectional view taken on the line 2—2 of Fig. 1;

Fig. 3 is an enlarged longitudinal section showing the connection of the air tube to the tire valve;

Fig. 4 is a section taken on the line 4—4 of Fig. 2;

Fig. 5 is an enlarged elevation illustrating the gages and air pump connection;

Fig. 6 is an end elevation of the pipe connections to the gages and to the several tires; and Fig. 7 is an enlarged detail section showing one of the test valves.

Referring in detail to the drawing, W designates the vehicle wheels and T the inflatable pneumatic tire with which each wheel is equipped. The inner tube of the tire has the usual inflating valve V extending through the wheel felly.

Upon the outer end of the hub H of each vehicle wheel, a cap 5 is securely fixed in any approved manner. This cap is formed with a reduced threaded extension 6. 7 designates a cylindrical metal sleeve closed at one of its ends. The body wall of the sleeve at its other end is interiorly threaded for engagement upon the threaded extension 6 of the cap and is preferably provided with ears indicated at 8 which are apertured to receive a tightening or clamping bolt 9. Thus after the sleeve 7 has been threaded upon the end of the hub cap, it may be positively clamped thereon at its threaded end so as to obviate any possibility of relative rotation of said sleeve. One arm of an angular air pipe or tube 10 extends axially through the closed end of the sleeve 7, and the other arm of said tube located within the sleeve is radially disposed and extends through an opening in the body wall of said sleeve.

Upon the axially extending arm of the air tube 10, a collar 11, preferably of brass, is loosely engaged. In this collar one end of a second metal air tube 12 is fixed, and projects radially from the periphery of said collar at its extremity. The opposite end of this air tube extends radially inward, as shown at 13, in spaced relation to the end face of the collar 11. This collar is formed with a radial oil duct 14 which extends inwardly to the bore thereof and oil is supplied to said duct from a suitable oil cup 15 mounted on the collar.

The end of the longitudinal arm of the air tube 10 projects beyond the collar 11 to receive the nut 16, said nut being positively held against the end face of the collar by means of a cotter pin 17 engaged through the end of the air tube.

The collar 11 at one end is threaded upon its periphery to receive the interior threads on one end of a metal cap or casing 18 which incloses the radially disposed end 13 of the air tube 12, the open end of said tube, however, being spaced from the wall of said casing. This space within the casing between the end wall thereof and the collar 11 constitutes an air receiving chamber indicated at 19.

A tube of rubber or other flexible material 20 is threaded or otherwise detachably connected at one of its ends to the extremity of the radial arm of the air tube 10 and the other end of this flexible tube is interiorly provided with a rod or plunger 21 which may be of any preferred form and construction and is adapted to engage the stem of the tire valve when the tube is threaded upon the valve casing to unseat said tire valve and open communication between the tube 20 and the inflatable tube of the pneumatic tire. A dust cap indicated at 22 is preferably provided and is shiftable upon the tube 20 and adapted to be threaded on the tire valve casing to inclose the connected end of the tube 20 and obviate any possibility of dust or grit entering the interior thereof.

A second tube 23 of rubber or other flexible material is connected at one of its ends to the radially disposed extremity of the air tube 12 fixed in the collar 11. The tubes 23 for the forward vehicle wheels are extended upwardly and suitably connected to the wheel fender F, as shown at 24, while the tubes 23 for the rear wheels of the machine are preferably connected to a suitable coupling means, shown at 25 mounted in the rear ends of the running boards of the vehicle. It is however to be understood that the present invention is not to be limited to these particular points of connection of the tubes 23, as they might as well be connected to other parts of the machine body.

Upon the dash board of the vehicle body, an air pressure gage for each vehicle wheel, indicated at 26, is suitably mounted. These gages are respectively connected by means of the tubes or conduits 27 to the respective couplings 24 and 25 of the ends of the tubes 23, and complete the air supply system between the tubes of the wheel tires and the several gages. Preferably, though not necessarily, each of the metal air tubes 10 is provided in its radially extending end portion with a suitable valve shown at 28 whereby communication between any one of the wheel tires and the gage therefor may be cut off when, for any reason, it is desired to remove the gage or the pipe connection 27 without releasing the air from the wheel tire. These tubes or conduits 27 may be either of rubber or other flexible material, or metal and suitably secured to parts of the vehicle body where they will be the least conspicuous. Each conduit 27 is also provided immediately below the gage with which it is associated, with a valve 29. The casing of the valve 29 is provided with a valve seat indicated at 30 and an air outlet port or opening 32 leading from said valve seat to the atmosphere. When the valve 29 is engaged with its seat, the air may freely pass around the stem of the valve and upwardly into the gage. The particular purpose of this valve will be hereinafter fully explained.

To the downwardly extending pipe connections of the gages 26, a horizontally disposed pipe 34 is suitably coupled, and a pipe 35 leading from an air compression pump (not shown) is centrally connected to the pipe 34. The pipe 34 at its connection with each of the gage pipes is equipped with a valve indicated at 36 which may be of any ordinary or approved construction.

When the valves 29 are disposed in the position seen in Fig. 6 of the drawing, the several gages are connected to the respective pneumatic tires, it being understood that all of the valves 36 are closed. The air connection with the respective tires is established through the medium of the pipe or conduit 27, the tube 23, an air chamber 19, the tubes 12 and 10 and the tube 20 so that the gage will register the amount of air pressure in the tire tube. The operator is thus enabled to ascertain at a glance whether or not air pressure in any one of the tires is below normal. If so, he opens the valve 36 connecting the pipe 35 to the particular gage connection 27, and starts the pump in operation. Compressed air will then be supplied through the pipes 34 and 35 to the tire tube whereby the tube is again inflated to normal pressure as may be noted by reading the gage. The valve 36 is then closed to prevent overinflation of the tire.

When it is desired to ascertain if there is any obstruction in the air pipes 27, the valve 29 is adjusted and disengaged from its seat 30 so that the air may escape through the outlet port or opening 32. By listening to the sound of the escaping air, the operator will be able to judge whether or not the air is escaping under full pressure, and if not he will understand that there is some obstruction in the pipe connections with the tire tube.

From the foregoing description taken in connection with the accompanying drawings, the construction, manner of operation and several advantages of my invention will be clearly and fully understood. By supplying oil to the bore of the relatively stationary collar 11, this oil acts as a seal between the collar and the rotating air pipe or tube 10 which is fixed in the sleeve 7 secured on the hub cap. A heavy grease or other packing medium may be applied to the threads of the collar 11 to prevent any possibility of the escape of air from the chamber 19 between the wall of the cap 18 and this collar. It will thus be seen that I have devised a very simple device for giving a constant indication of the pressure in the several tires of the vehicle and also for inflating any one of said tires, which is at all times operative, both when the vehicle is in operation and when it is standing still. A device constructed in the manner above explained, is highly effective and reliable for the intended purpose, and can be readily applied to the ordinary motor vehicle without making any material structural alterations therein. The air gages may of course be of any preferred type, and while I have herein referred to the gages as being mounted on the dash board of the vehicle body, they may be arranged at any other convenient point.

It is also to be understood that while I have herein shown and described the preferred form, construction and relative arrangement of the several elements, the device is nevertheless susceptible of considerable modification therein, and I therefore, reserve the privilege of adopting all such legitimate changes as may be fairly embodied within the spirit and scope of the invention as claimed.

Having thus fully described my invention, what I desire to claim and secure by Letters Patent is:

In a vehicle, the combination with a vehicle wheel having a pneumatic tire, of an axially projecting sleeve detachably mounted upon the hub of the wheel, an angular air tube mounted in said sleeve and having one of its arms extending axially relative to the hub, the other arm extending radially out through said sleeve, a flexible connection between the last named arm of the tube and the inflatable tube of the pneumatic tire, a collar loosely engaged on the axially disposed arm of said tube and freely rotatable thereon, an air tube fixed in said collar, one end of the tube projecting in a position in advance of the axially disposed arm of the first named tube and the other end of the second named tube projecting radially from the collar, a cap detachably engaged with the collar, and second named tube and constituting an air chamber, said chamber surrounding the adjacent ends of the first and second named tubes establishing communication between said tubes and means for supplying compressed air to the outwardly projecting end of the second named tube.

In testimony whereof I hereunto affix my signature in the presence of two witnesses.

ORLANDO H. MEYERS.

Witnesses:
HARRY Z. SMITH,
J. D. SCHNEIDER.